US008725620B2

(12) United States Patent
Morimoto

(10) Patent No.: US 8,725,620 B2
(45) Date of Patent: May 13, 2014

(54) SYSTEM AND METHOD FOR NEGOTIATING IMPROVED TERMS FOR PRODUCTS AND SERVICES BEING PURCHASED THROUGH THE INTERNET

(76) Inventor: Nobuyoshi Morimoto, Tokyo (JP)

( * ) Notice: Subject to any disclaimer, the term of this patent is extended or adjusted under 35 U.S.C. 154(b) by 3593 days.

(21) Appl. No.: 09/895,457

(22) Filed: Jun. 29, 2001

(65) Prior Publication Data
US 2002/0013774 A1 Jan. 31, 2002

Related U.S. Application Data

(63) Continuation-in-part of application No. 09/613,339, filed on Jul. 10, 2000, now Pat. No. 7,720,770.

(51) Int. Cl.
*G06Q 30/00* (2012.01)
(52) U.S. Cl.
USPC .................. 705/37; 705/26; 705/27; 705/38; 705/80
(58) Field of Classification Search
USPC ..................................... 705/26, 27, 37, 80, 38
See application file for complete search history.

(56) References Cited

U.S. PATENT DOCUMENTS

| | | | |
|---|---|---|---|
| 5,826,244 A | 10/1998 | Huberman | |
| 5,842,178 A | 11/1998 | Giovannoli | 705/26 |
| 5,926,798 A | 7/1999 | Carter | 705/26 |
| 5,970,475 A | 10/1999 | Barnes et al. | |
| 6,041,308 A | 3/2000 | Walker et al. | |
| 6,108,639 A | 8/2000 | Walker et al. | |
| 6,119,094 A | 9/2000 | Lynch et al. | 705/5 |
| 6,119,101 A | 9/2000 | Peckover | 705/7 |
| 6,125,352 A | 9/2000 | Franklin et al. | 705/26 |
| 6,141,653 A | 10/2000 | Conklin et al. | 705/80 |
| 6,285,986 B1 | 9/2001 | Andrews | |
| 6,377,940 B2 * | 4/2002 | Tilfors et al. | 705/37 |
| 6,587,835 B1 | 7/2003 | Treyz et al. | |
| 6,871,190 B1 * | 3/2005 | Seymour et al. | 705/37 |
| 6,871,191 B1 | 3/2005 | Kinney et al. | |
| 2002/0002531 A1 * | 1/2002 | Lustig et al. | 705/37 |
| 2002/0029188 A1 | 3/2002 | Schmid | |

OTHER PUBLICATIONS

Online Article: "Online Shopper; Reviving the Fine Art of Haggling, Online," *The New York Times*, Jan. 20, 2000.
Online Article: "Let the Cyber Buyer be in Control," *Businessweek Online, Information Technology*, Nov. 8, 1999.

(Continued)

*Primary Examiner* — Nga B. Nguyen
(74) *Attorney, Agent, or Firm* — Robert C. Kowert; Meyertons, Hood, Kivlin, Kowert & Goetzel, P.C.

(57) ABSTRACT

A method and system for negotiating improved terms for a product being purchased over the Internet. Once a purchaser has made a decision to buy a specific product over the Internet, the purchaser may use the services of a personal negotiating broker-agent program to beat the best available purchase transaction within a specifiable time window. The personal broker-agent program may detect an issuance of a commitment to purchase over the Internet by a purchaser. The personal broker-agent program may then make an offer to the purchaser the option of waiting a predetermined amount of time while the broker agent searches for improved items. On acceptance of the option by the purchaser, the personal broker-agent program may conduct an auction and/or search the Internet for a better deal and may evaluate the auction and/or search responses to determine the best deal. The personal broker-agent program may then execute the best deal. If the purchaser elects not to accept the option from the personal broker-agent program, then the purchaser may execute the commitment to purchase transaction without delay.

44 Claims, 9 Drawing Sheets

(56) References Cited

OTHER PUBLICATIONS

Official Action from U.S. Appl. No. 09/613,339, filed Jul. 10, 2000, mailed Apr. 25, 2006.

Press release: "Televideo Invests in Hot New Online Shopping Solution, San Jose, CA, Sep. 22, 1998," (NASDAQ:TELV) (www.mysimon.com, Jun. 12, 2001).

Press release:"CNET, Inc. Completes Acquisition of mySimon, inc.; San Francisco, CA, Mar. 1, 2000" (www.CNET.com, Jun. 12, 2001).

"The Anatomy of a Large-Scale Hypertextual Web Search Engine," Sergey Brin and Lawrence Page, Seventh International World Wide Web Conference, Brisbane, Australia, Apr. 14-18, 1998.

* cited by examiner

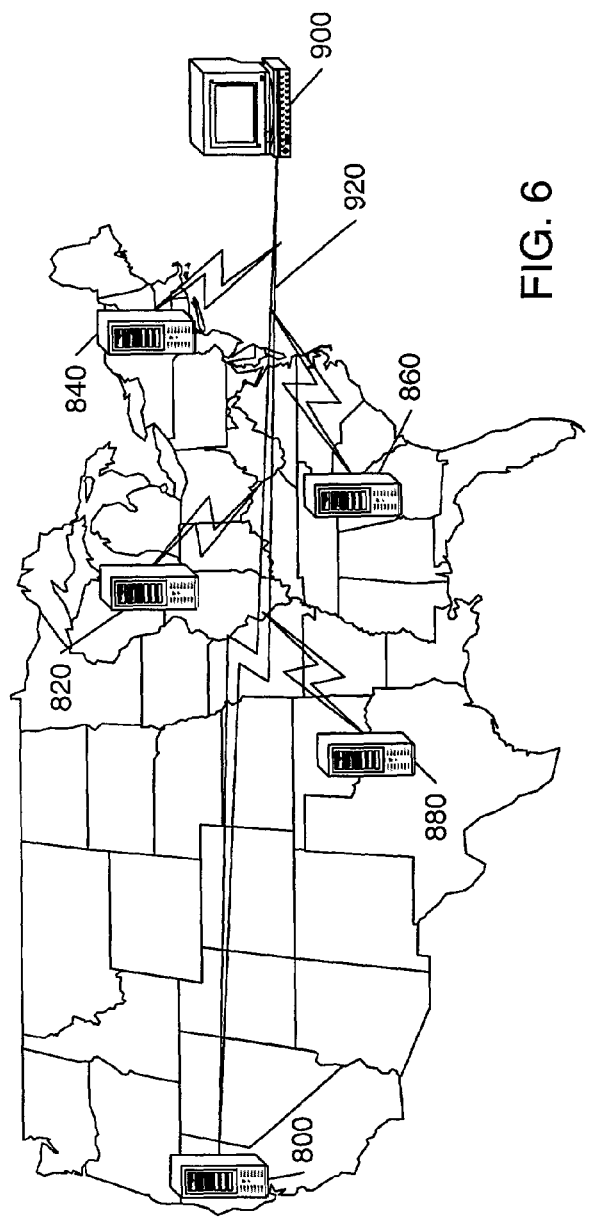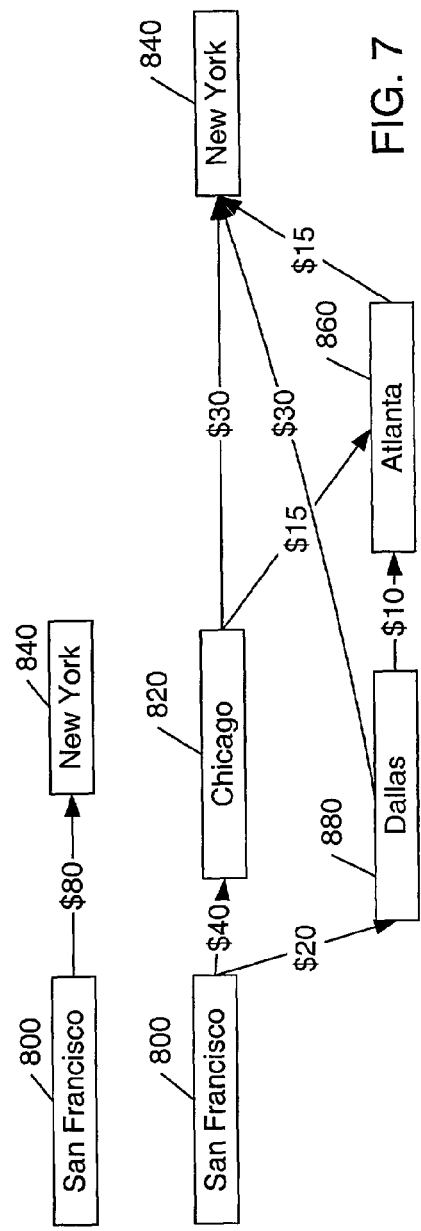

SYSTEM AND METHOD FOR NEGOTIATING IMPROVED TERMS FOR PRODUCTS AND SERVICES BEING PURCHASED THROUGH THE INTERNET

CROSS-REFERENCE TO RELATED APPLICATIONS

This application is a continuation-in-part of U.S. patent application Ser. No. 09/613,339, filed on Jul. 10, 2000 now U.S. Pat. No. 7,720,770, by Nobuyoshi Morimoto, titled "System and Method for Negotiating Improved Terms for Products and Services Being Purchased Through the Internet".

BACKGROUND OF THE INVENTION

1. Field of the Invention

The present invention generally relates to the Internet. More particularly, the present invention relates to a system and method for negotiating improved terms for products and services being purchased over the Internet.

2. Description of the Related Art

Internet commerce has become an increasingly popular form of commerce in the United States and throughout the world. In general, Internet-based commerce, often referred to as e-commerce, provides advantages to both suppliers and consumers. E-commerce provides vendors and service providers the ability to greatly increase their sales channel and distribution network with minimal cost. An Internet commerce site provides a convenient, effective and secure mechanism for potential buyers to browse, select and purchase goods or services in an easy and simple fashion.

The traditional purchasing process typically starts with the purchaser specifying the product specifications or requirements, including commercial terms such as price or delivery. The purchaser typically browses through a plurality of Internet commerce sites to locate the best deal, i.e., locating an Internet site, which matches the product specifications as specified by the purchaser, including the commercial terms. Very often the purchaser may not have the necessary skills to conduct an effective search for the best deal on the Internet. For example, the purchaser may only look at one or two popular Internet sites and ignore the rest.

A few Internet sites such as search engines may offer specialized shopping services. The search engine for shopping may allow the purchaser to set up a query or criteria for search. For example, a purchaser may specify a particular product brand name, model number, price, or delivery. The purchaser may specify a price not to exceed, or a price range or starting price. On specifying the criteria, the search engine may conduct a search for Internet sites matching the purchaser criteria.

Yet another method of purchasing products through the Internet, may utilize the purchasers participation in a group of purchasers to obtain volume discounts on price for a specific product.

A common dilemma faced by many purchasers is the uncertainty of knowing whether they have secured the best deal available. A question that is common to all purchasers who may have made a purchase through the Internet is 'Am I getting the best deal?' or 'Is there any other supplier who wants to give me a better deal?' For example, a purchaser may think they have been offered the lowest price for a DVD player at a popular shopping site only to later find out that a manufacturer's outlet store was offering an even lower price. Most consumers, however, do not have the time or patience to search hundreds of different stores and web sites to find the ultimate lowest price.

For these reasons, it would be desirable to provide a system and method for negotiating better terms for products and/or services purchased through the Internet. It would be desirable for the method and system to use a personal negotiating or broker-agent, which would secure the commitment of the purchaser to purchase a product, and yet at the same time be able to dynamically locate and/or negotiate a better deal on behalf of the purchaser. Advantageously, the method and system would in many instances deliver savings to the purchaser without additional effort on purchaser's part while also delivering profits to the personal negotiating agent service provider.

SUMMARY OF THE INVENTION

The present invention provides various embodiments of a system and method for locating and/or negotiating improved terms for products and/or services purchased over the Internet. Once a purchaser has made a decision to buy a specific product or service over the Internet, the purchaser may use the services of a broker-agent program to attempt to beat the specific price, delivery time, warranty, return policy or other terms and conditions within a specifiable time window. Note, while a produce purchase shall be used in many of the example embodiments herein, it is understood that the system and method disclosed herein are just as applicable to the purchase of a services as they are to the purchase of a product.

In one embodiment, the personal broker-agent program may detect an issuance of a commitment to purchase by a purchaser over the Internet. Various methods, such as an entry of a credit card number or clicking of a "confirm order" button, may be deployed to detect the issuance of the commitment to purchase. The personal broker-agent program may then get details of the commitment to purchase and determine if the purchase (e.g., based on the type of product service or the dollar amount of the purchase) is of business interest. If the purchase is of interest, then the personal broker-agent program may make an offer to the purchaser to accept or reject a contract to find the specified product with improved terms within a specified time window. The purchaser may accept or reject the contract, depending on the purchaser's ability to wait the time proposed by the personal broker-agent program.

If the purchaser accepts the contract, the personal broker-agent program may conduct an auction and/or search the Internet and other sources for a better deal. The provider of the personal broker-agent program may establish pre-negotiated agreements with preferred suppliers whereby the preferred supplier may guaranty a better price (e.g., by some fixed percentage) than the price included with the commitment to purchase. In one embodiment, the savings may be, in part, passed on to the purchaser and, in part, retained by the provider of personal broker-agent program as profit.

The personal broker-agent program may evaluate the auction responses and/or search results to determine the best deal. The contract between the purchaser and the personal broker-agent program may then be executed for the best deal. If the purchaser elects not to accept the contract offer from the personal broker-agent program, then the purchaser may execute the original transaction.

Advantageously, the embodiments described above may potentially deliver savings to the purchaser and at the same time deliver profits to the personal broker-agent program provider. Furthermore, suppliers of Internet products may experience higher sale volumes by dealing with the broker-agent program provider.

BRIEF DESCRIPTION OF THE DRAWINGS

FIG. 6 illustrates one embodiment of a network of regional shipping locations, hubs, or transfer points; and FIG. 7 illustrates how an indirect shipping route with one or more intermediate destinations may be less expensive than a direct shipping route.

Figure 1:
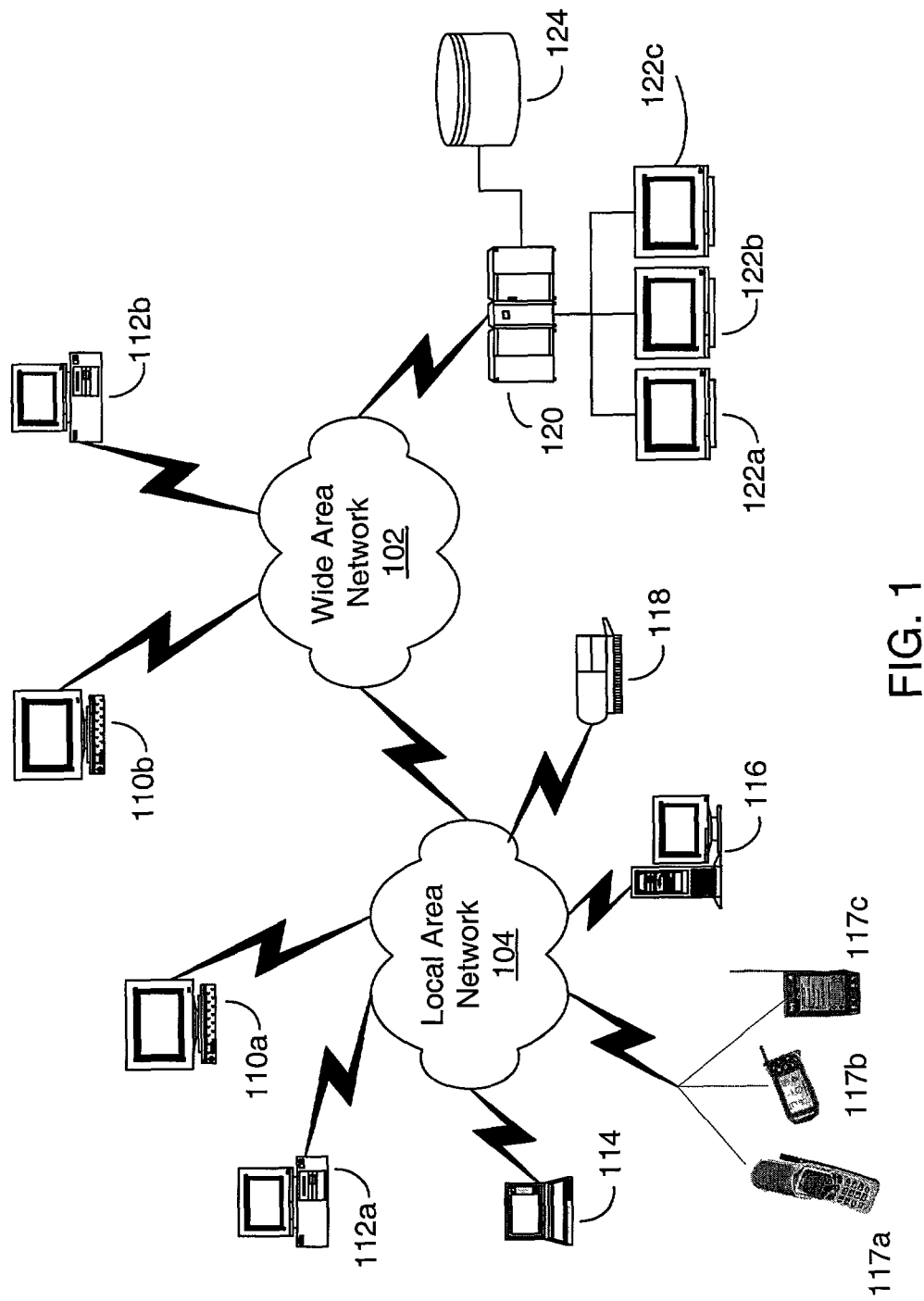
FIG. 1 is a network diagram of one embodiment of a wide area network, which is suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims.

DETAILED DESCRIPTION OF SEVERAL EMBODIMENTS

FIG. 1: Wide Area Network

FIG. 1 illustrates a wide area network (WAN) according to one embodiment. WAN 102 is a network that spans a relatively large geographical area. The Internet is an example of WAN 102. WAN 102 typically includes a plurality of computer systems which are interconnected through one or more networks. Although one particular configuration is shown in FIG. 1, WAN 102 may include a variety of heterogeneous computer systems and networks which are interconnected in a variety of ways and which run a variety of software applications.

One or more local area networks (LANs) 104 may be coupled to WAN 102. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves).

Each LAN 104 includes a plurality of interconnected computer systems and optionally one or more other devices: for example, one or more workstations 110a, one or more personal computers 112a, one or more laptop or notebook computer systems 114, one or more server computer systems 116, and one or more network printers 118. As illustrated in FIG. 1, an example LAN 104 may include one of each of computer systems 110a, 112a, 114, 116, and 117a/b/c and one printer 118. The LAN 104 may be coupled to other computer systems and/or other devices and/or other LANs 104 through WAN 102. Private communication networks, often referred to as an Intranet 304a, may comprise of one or more LAN's 104 and one or more WAN's 102.

One or more mainframe computer systems 120 may be coupled to WAN 102. As shown, the mainframe 120 may be coupled to a storage device or file server 124 and mainframe terminals 122a, 122b, and 122c. The mainframe terminals 122a, 122b, and 122c may access data stored in the storage device or file server 124 coupled to or included in the mainframe computer system 120.

WAN 102 may also include computer systems, which are connected to WAN 102 individually and not through a LAN 104: as illustrated, for purposes of example, a workstation 110b and a personal computer 112b. For example, WAN 102 may include computer systems, which are geographically remote and connected to each other through the Internet or the Intranet.

Figure 2:
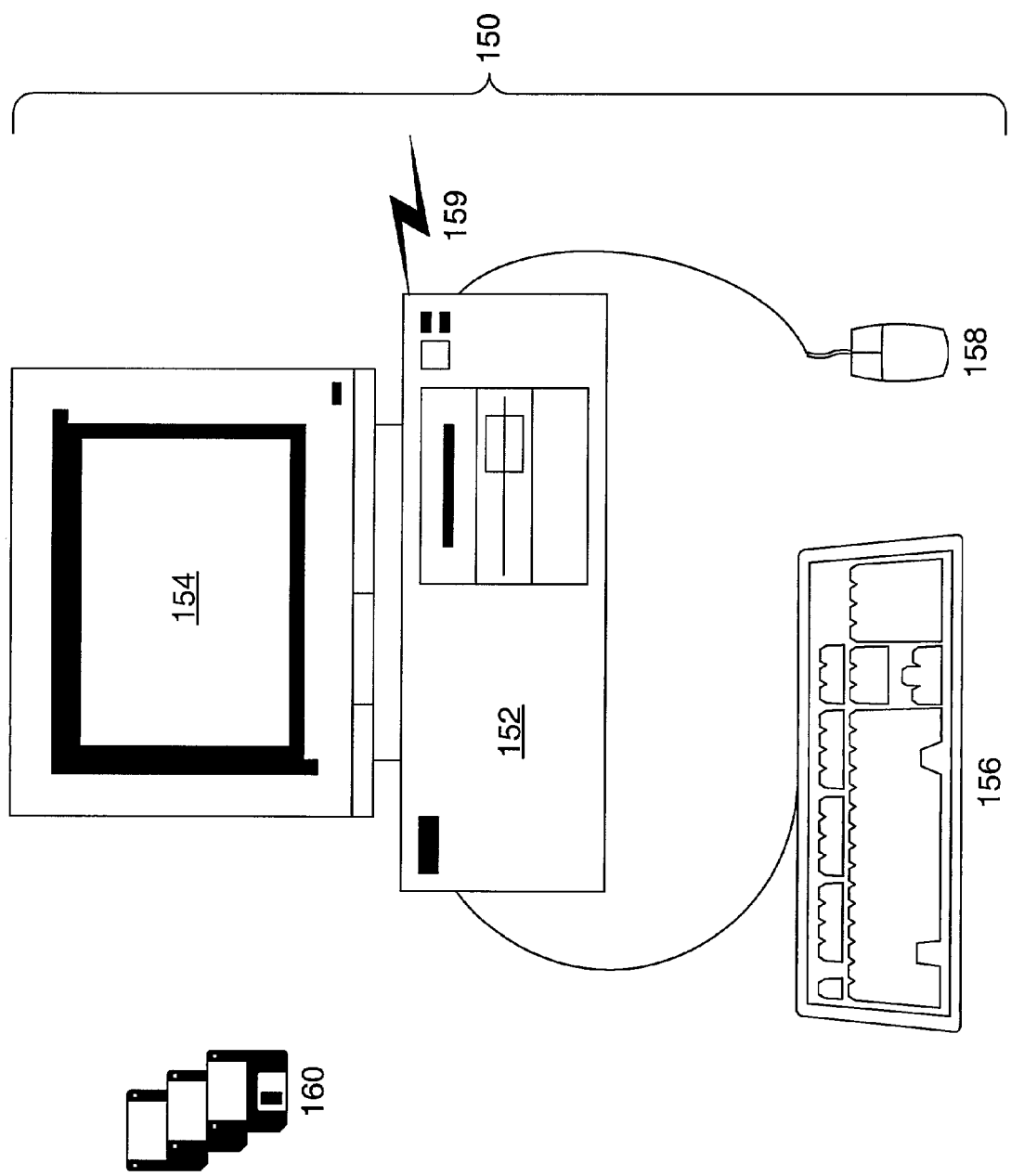
FIG. 2 is an illustration of one embodiment of a typical computer system, which is suitable for implementing various embodiments.

FIG. 2: Typical Computer System

FIG. 2 illustrates a typical computer system 150, which is suitable for implementing various embodiments of a system and method for negotiating improved terms for a product being purchased over the Internet. Each computer system 150 typically includes components such as a CPU 152 with an associated memory medium such as floppy disks 160, CD-ROMs, or DVDs (not shown). The memory medium may store program instructions for computer programs, wherein the program instructions are executable by the CPU 152. The computer system 150 may further include a display device such as a monitor 154, an alphanumeric input device such as a keyboard 156, communication device such as a modem 159 and a directional input device such as a mouse 158.

In one embodiment, the computer system 150 may be a client computer 306, operable by a computer user, to execute the computer programs to negotiate improved terms for a product being purchased over the Internet as described herein. In another embodiment, the computer system 150 may be an e-commerce server 302 operable to execute the computer programs to negotiate improved terms for a product being purchased as described herein. Other embodiments of the computer system 150 may include, but are not limited to, a proxy server 312, a local Internet server 322, a mainframe computer, a personal computer, and several others as described herein.

The computer system 150 preferably includes a memory medium on which computer programs according to various embodiments may be stored. The term "memory medium" is intended to include an installation medium, e.g., a CD-ROM, or floppy disks 160, a computer system memory such as DRAM, SRAM, EDO RAM, Rambus RAM, or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution. The computer system 150 may also include a time keeping device such as a real-time clock. The real-time clock of the computer system 150 may be, periodically or on demand, synchronized with a global standard time clock. Also, the computer system 150 may take various forms, including but not limited to a personal computer system, mainframe computer system, workstation, network appliance, Internet appliance, personal digital assistant (PDA), Internet enabled PDA 117b or 117c, web television system, Internet enabled cellular telephone 117a or any other similar device. In general, the term "computer system" can be broadly defined to encompass any device having a processor, which executes instructions from a memory medium.

The memory medium preferably stores a software program or programs for negotiating improved terms for a product being purchased over the Internet as described herein. The software program(s) may be implemented in any of various ways, including procedure-based techniques, component-based techniques, and/or object-oriented techniques, among others. For example, the software program may be implemented using ActiveX controls, programming languages such as C++, Java, Visual Basic, object oriented software based on COM/DCOM and/or CORBA objects, JavaBeans, Microsoft Foundation Classes (MFC), browser-based applications (e.g., Java applets), traditional programs, or other technologies or methodologies, as desired. A CPU, such as the host CPU 152, executing code and data from the memory medium includes a means for creating and executing the software program or programs according to the methods and/or block diagrams described below.

Figure 3A:
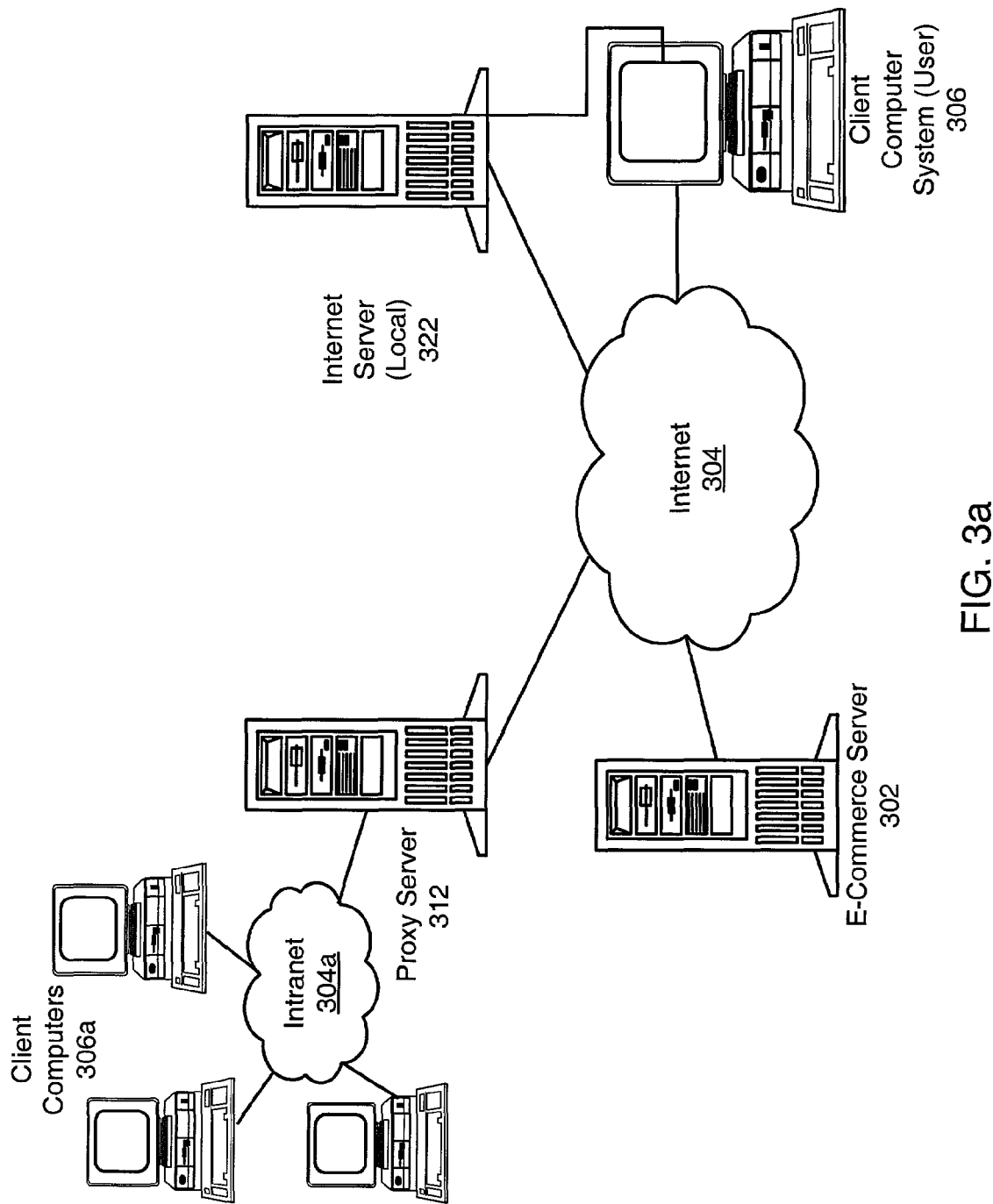
FIG. 3a illustrates an exemplary e-commerce network system for identifying distinctive computer users accessing a web site according to one embodiment.
Figure 3B:
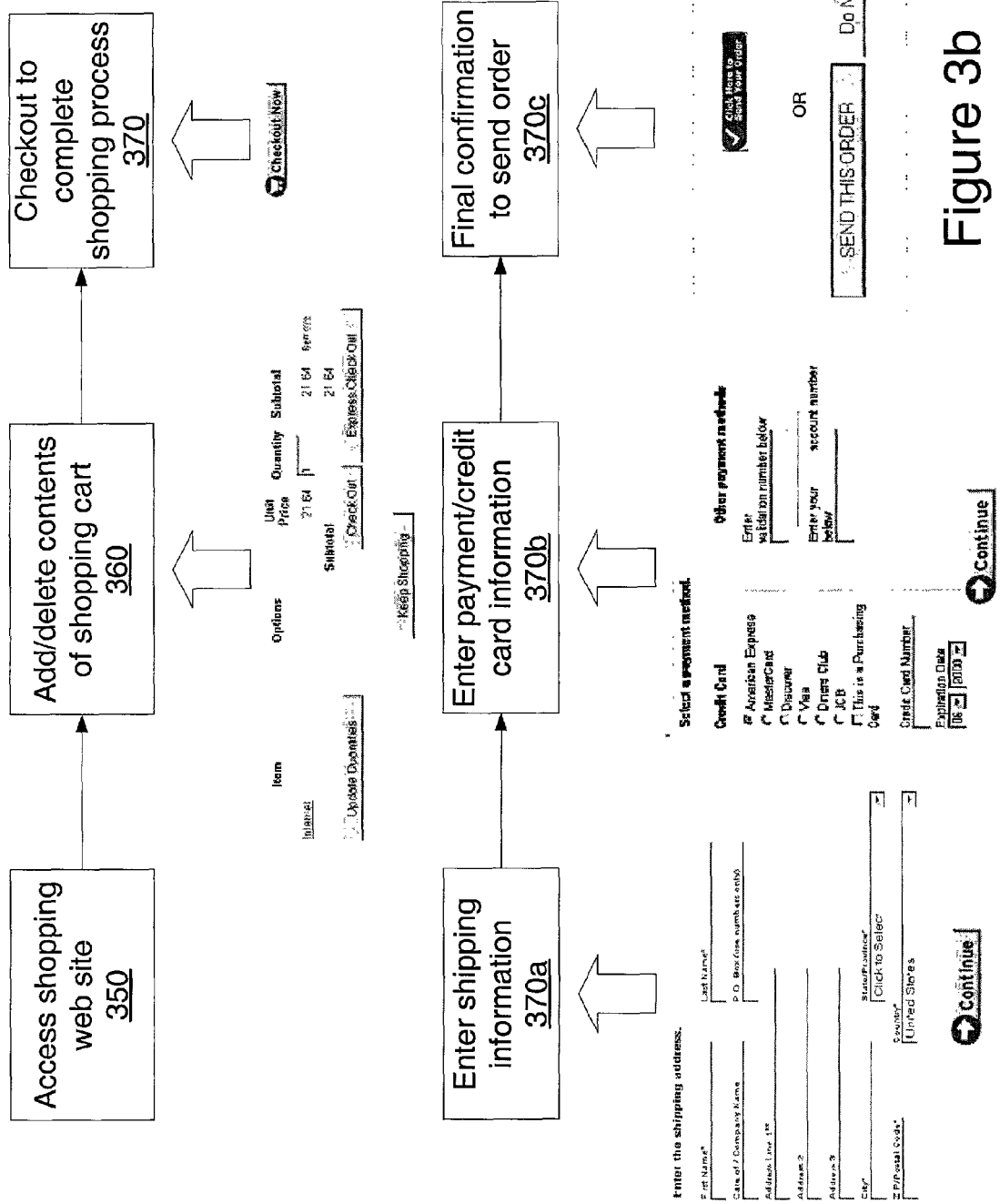
FIG. 3b illustrates an exemplary block diagram of an Internet based purchasing process.
Figure 4A:
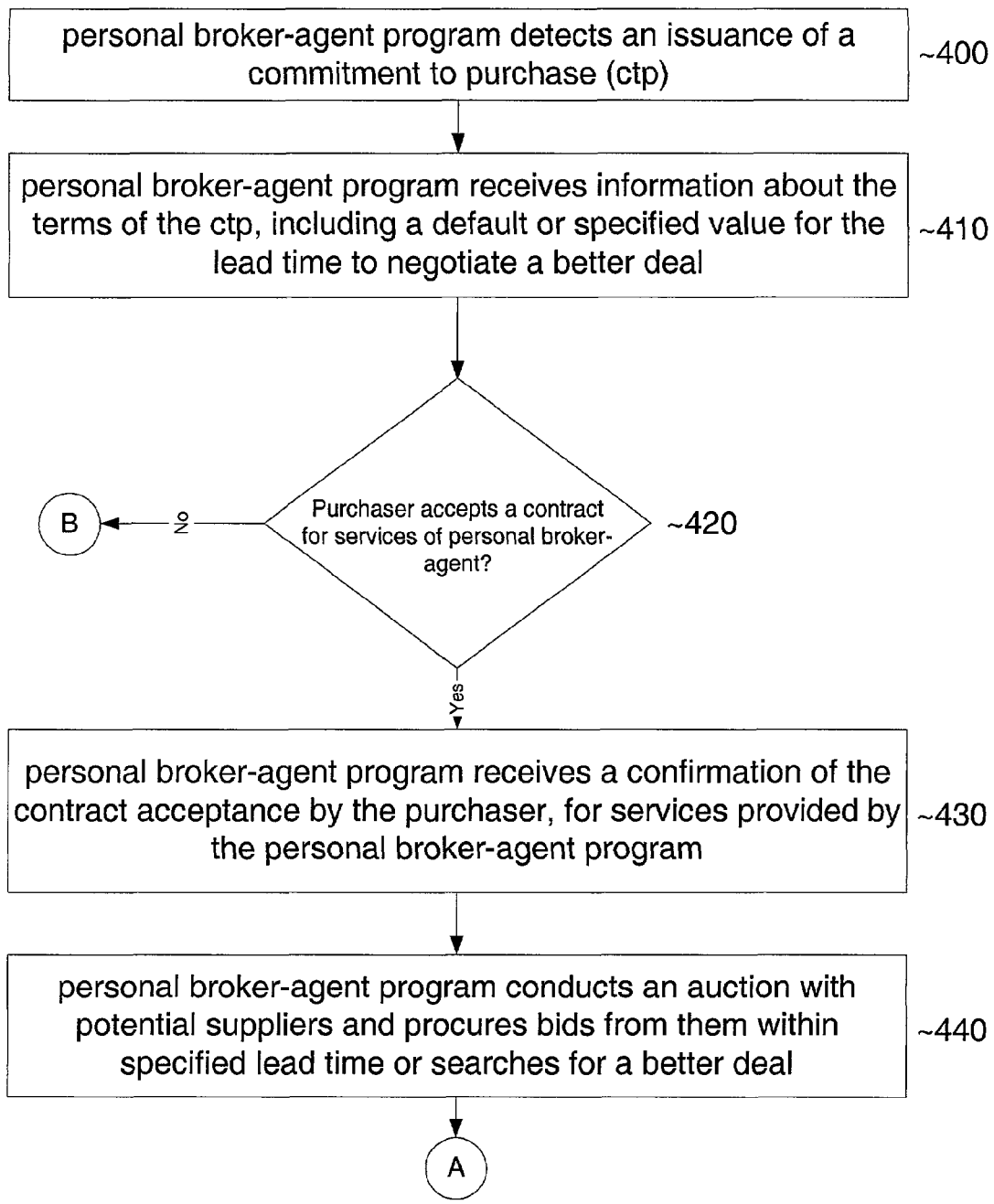
FIGS. 4a, 4b, 4c and 4d illustrates a flow chart for one embodiment of a method for negotiating improved terms for a product being purchased over the Internet.
Figure 4B:
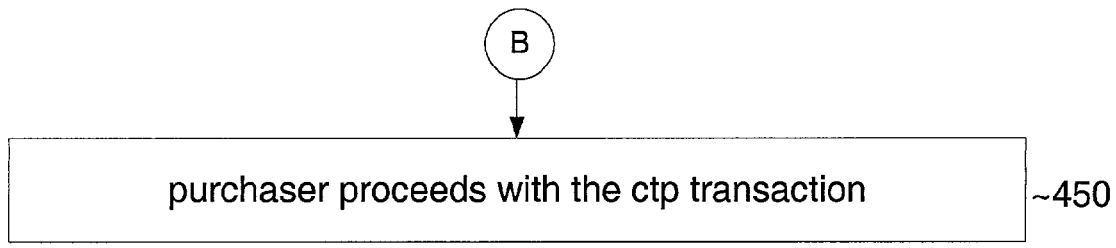
Figure 4C:
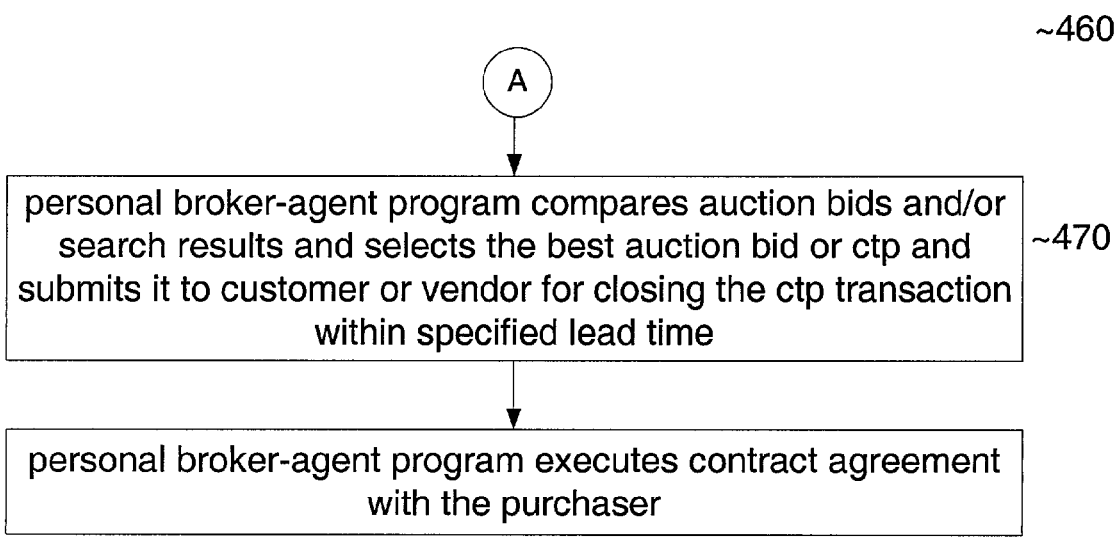
Figure 4D:
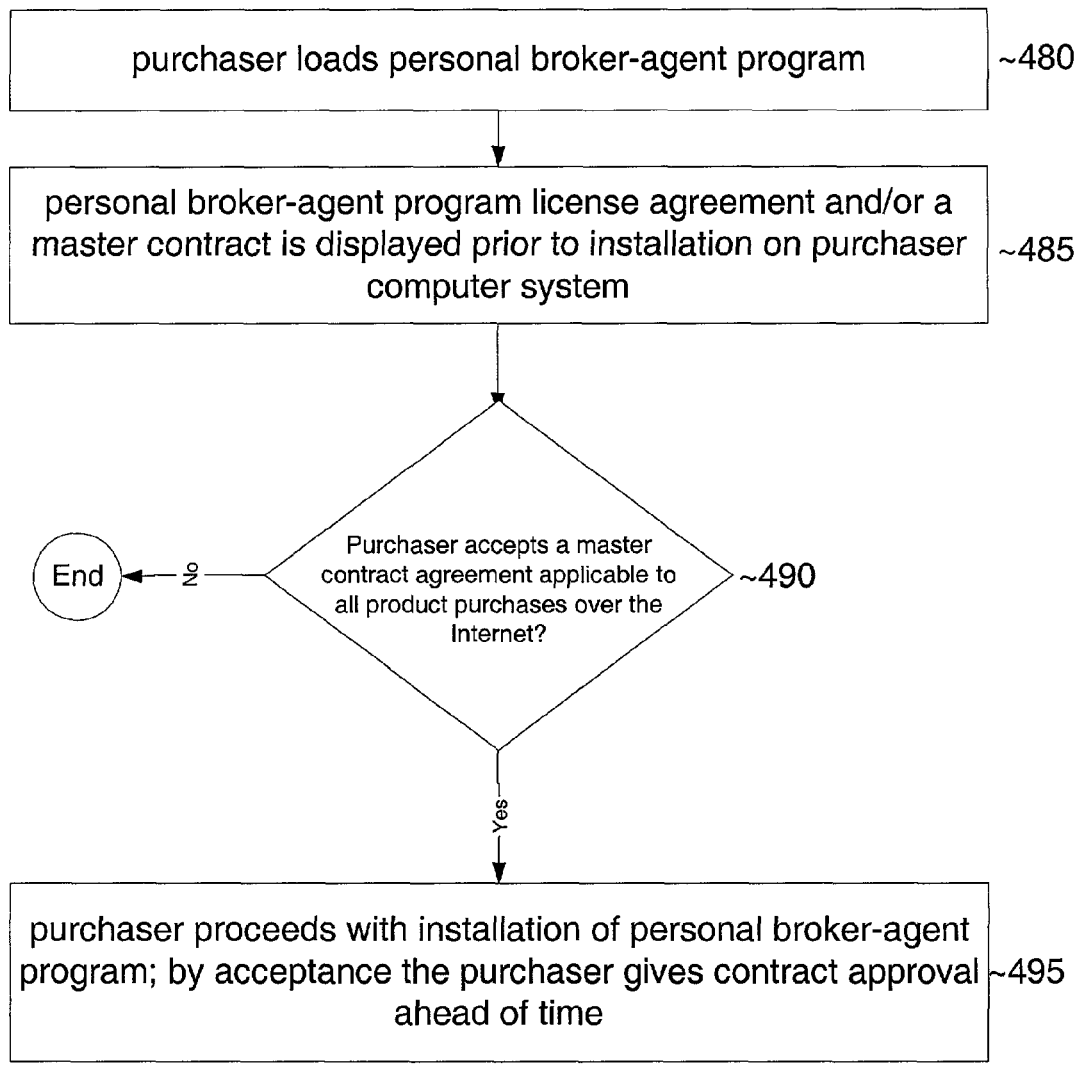

FIGS. 3a and 3b: Network System to Negotiate Improved Terms for a Product Being Purchased and Block Diagram of an Internet-Based Purchasing Process FIG. 3a illustrates a simplified and exemplary Internet commerce or e-commerce network system to negotiate improved terms for a product being purchased according to one embodiment. FIG. 3b illustrates an exemplary block diagram of an Internet-based purchasing process.

As used herein, the term "Computer User" is intended to include any business or person who can operate a computer 150 to gain access to an Internet web site hosted by server 302. In one embodiment, the access to an Internet web site may be provided by a proxy server 312. As used herein, the term "web site" is intended to include all Internet 304 as well as Intranet 304a sites, including e-commerce sites and groups of noncommercial Web pages, which can be accessed by a Uniform Resource Locator (URL).

As shown, the system may include an Internet server (local) 322, a proxy server 312 and an e-commerce server 302. All three servers shown are various embodiments of the computer system 150. The e-commerce server 302 is preferably maintained by a vendor who offers goods or services over the Internet. One example of an e-commerce vendor is Amazon.com, which sells books and other items over the Internet. In one embodiment, a web site may not directly offer goods and services for sale at the web site. For example, it may be a portal site to serve as a facilitator for buyers and sellers rather than offering goods and services directly for sale on its web site. The web site may only provide information to client computer users by providing URL links to buyers and sellers. A search engine web site, as another example, may only provide links to relevant web sites or its advertisers but may not sell goods or services at its own web site.

As shown, the e-commerce server 302 may be connected to a network 104, preferably the Internet 304. The Internet 304 is currently the primary mechanism for performing electronic commerce. However, the present invention may be used with any of various types of LAN's and/or WAN's, such as the Internet 304 and/or the Intranet 304a, which connects computers and networks of computers together, thereby providing the connectivity for enabling electronic commerce.

A client computer 306 may also be connected to the Internet 304 directly or via a local Internet server 322. One or more client computers 306a may be connected to the Internet 304 via a proxy server 312 and an Intranet 304a. The client computer system 306 user may launch or execute Web browser software for allowing a user of the client computer 306 i.e., a client or a customer or a purchaser or a user, to browse and/or search the Internet 304 for products and services. The client computer system 306 also enables the purchaser to conduct e-commerce transactions over the Internet 304. For example, an e-commerce transaction may include a request for information, a purchase of a product, a payment, or a request to check order status. When the user of the client computer 306 desires to obtain information and/or purchase a good or service from a vendor over the Internet 304, the Web browser software preferably accesses the Web page of the respective e-commerce server, such as e-commerce server 302. The client may access the Web page of the e-commerce server 302 directly or may access the site through a proxy server 312 or some other third party like a search engine. When the client Web browser accesses the Web page of the e-commerce server 302, the e-commerce server 302 may recognize the computer user 306 as a potential purchaser.

The e-commerce server 302 may subsequently provide various data and information to the client browser on the client system 306, possibly including the products (goods and/or services) offered, descriptions and prices of these products, and other information that would typically be valuable to the purchaser of a product or a service. As used herein, the term "product" is intended to include various types of goods or services, such as books, CDs, content subscription services, furniture, online auction items, clothing, ISP service, consumer electronics, travel, software, medical supplies, computer systems, or various services such as loans (e.g., auto, mortgage, and home refinancing loans), securities (e.g., stocks, retirement accounts, bonds, and mutual funds), or insurance (e.g., life, health, auto, and home owner's insurance), among others.

In one embodiment, the personal broker-agent may use the Extensible Markup Language (XML) format to exchange information with an e-commerce vendor and an e-commerce server 302. For example, the XML format may allow simple communication between entities without requiring identical formats or languages. This embodiment allows the personal broker-agent to communicate with a greater number of e-commerce vendors, thereby improving the personal broker-agent's ability to find better deals for the purchaser. In another embodiment, the XML format may be used for communications between the personal broker-agent and the client computer 306 thereby allowing the purchaser easier access to the services offered by the broker-agent without the additional expense of a standardized data format or translating data to a standardized data format. This embodiment allows for greater flexibility in data fields used in communications exchanges, and does not limit the personal broker-agent to only several different fields, such as price. Instead, using XML the personal broker-agent is allowed to search for many different terms to get the best deal for the purchaser.

FIG. 3b illustrates one embodiment of an Internet-based purchasing process. The everyday shopping process may be applied in an e-commerce environment. The purchaser accessing an e-commerce server 302 may be analogous to a customer entering a store for shopping. The customer may initiate the electronic commerce shopping process by utilizing a virtual shopping cart, passing through various 'sections' or departments within the virtual store and adding one or more products to the virtual shopping cart. The customer may edit the contents of the shopping cart 360 by adding new items to the shopping cart, revising item quantities, or deleting items included in the shopping cart. The customer may confirm purchase by going through the check out process. The customer may end the shopping process by checking out 370, i.e., entering shipping information 370a, by making a payment for the contents of the shopping cart and accepting all the terms of the purchase 370b and clicking on a final confirmation button to send the order 370c. Clicking on a confirm order button on the screen may be described as placing a commitment to purchase (ctp) or making a purchase.

The e-commerce server 302 may be operated by an e-commerce vendor, or on behalf of the e-commerce vendor by a third party company, such as a web site hosting service provider or an application service provider. In one embodiment, the e-commerce vendor may be a business, such as a wholesaler, while the purchaser may also be a business, such as a retailer. This embodiment allows the retailer to purchase goods at the best possible prices using the personal broker-agent, while offering lower prices to its own end-consumers. In another embodiment, the e-commerce vendor may be a consumer, offering for sale personal items, while the purchaser might also be a consumer. This embodiment allows consumers to purchase directly from other consumers, thereby avoiding any costs in a consumer selling its goods to a retailer to allow another consumer to purchase the same goods through the same retailer.

FIG. 3a illustrates an exemplary embodiment including one e-commerce server 302, one client computer system 306, one proxy server 312 connected with one or more client computers 306a via Intranet 304a, and one Internet Server (Local) 322 which may be connected to the Internet 104. However, it is noted that the present invention may be utilized with respect to any number of e-commerce servers 302, proxy servers 312, and clients 306 or 306a.

This and various other embodiments may provide a number of benefits to suppliers, purchasers, as well as web site operators offering a method for negotiating improved terms. First, the purchaser may get a better deal in terms of price and/or delivery or warranty, for products or services purchased through the Internet. The supplier may get a firm order with a guaranteed payment. The supplier may also receive a higher volume due to a pre-negotiated arrangement with a personal broker-agent service provider. The personal broker-agent service provider may receive fees and/or commissions from the purchaser and/or the supplier.

In one embodiment, the personal broker-agent may be an automated system controlled by a central server. The central server may be configured to search the Internet for better prices (e.g., by querying suppliers' servers). In another embodiment, system may include software configured to support a telephone connection providing automated voice-to-text services. The voice-to-text services may allow the purchaser to interact with the personal broker-agent via a telephone or mobile phone. The text generated by the voice-to-text software may in turn be interpreted by the central server and automated personal broker-agent.

In one embodiment, the search of the Internet for the best deal may be made more efficient by several personal broker-agents, or subagents, conducting different functions or searches in parallel. This may allow a better deal to be found in a shorter period of time. For example, one personal broker-agent or subagent could search for the best prices while another may simultaneously negotiate for the best warranties or return policies. Advantageously, this embodiment may allow the entire search process to be completed more quickly than a search conducted by a single personal broker-agent searching for several different terms in a serial fashion. Additionally, this embodiment may allow several subagents to conduct multi-negotiations without committing to any final agreement until the best deal is found among all subagents.

FIG. 4: Flow Chart for Identifying a Method for Negotiating Improved Terms for a Product Being Purchased Over the Internet According to One Embodiment FIG. 4 illustrates a flow chart for identifying a method for negotiating improved terms for a product being purchased over the Internet according to one embodiment. In step 400, the personal broker-agent program, which may be executing as a background task in a computer system may detect the purchaser issuing a commitment to purchase (ctp). In one embodiment, the personal broker-agent program may be executed as a browser plug-in. In one embodiment, the purchaser may install a personal broker-agent program to assist the purchaser in finding a better deal within a predetermined or a specified time period. In one embodiment, the specified time period may be as short as a few minutes or as long as several days, depending on the flexibility of the purchaser. In one embodiment, the specified time may default to a fixed value of say 30 minutes.

In one embodiment, the system may be configured to allow the purchaser to select different default standards for goods or services to be purchased for all future purchases through the personal broker-agent. For example, the system may allow the purchaser to require that all goods priced by the personal broker-agent be new (i.e., not refurbished). This embodiment would allow the personal broker-agent to search for the best deals according to the purchaser's default preferences. Additionally, the default standards set by the purchaser may include such risk factors as whether the goods are perishable, a scarcity or a good that carries possible product liabilities, such as chemicals. For example, this may allow the purchaser to instruct the personal broker-agent to reject any offers that include products that are perishable or a scarcity, which might carry a higher price or have a lower likelihood of having better terms available. This embodiment may allow the personal broker-agent to automatically reject any offers by vendors that do not conform to the purchaser default settings. Advantageously, this may contribute to the personal broker-agent finding the best deal within a certain time frame, by saving the time of consulting the purchaser and eliminating the non-conforming vendor offer automatically. In another embodiment, the system may be configured to consider the terms and conditions of the original purchase in addition to defaults directly entered into the personal broker-agent for any future purchases. This embodiment would allow the personal broker-agent to search for the best deals according to the purchaser's default and past purchase preferences within the set time period. In one embodiment, the personal broker-agent program may be automatically launched when the purchaser launches a web browser program on a computer system (e.g., as a browser plug-in). In another embodiment, the personal broker-agent program may be automatically launched when the purchaser initially powers on a computer system, being used to make a product purchase over the Internet. Once initiated, the personal broker-agent program may use various methods to detect the purchaser issuing, about to issue or has already issued a commitment to purchase (ctp). For example, in one embodiment, the personal broker-agent program may look for a specific URL address, which may include words such as 'confirm and order', 'checkout and shopping-cart', 'place and order'. In another embodiment, personal broker-agent program may search for a specific image file i.e. a gif for an icon or a button to check out the contents of a shopping cart. In another embodiment, the personal broker-agent program may look for a purchaser entering payment information 370*b*, for example, a credit card number, a gift certificate number or a pre-paid account card number, using a secure protocol (e.g., https://) to make a payment for a product or service purchase. In another embodiment, the purchaser may manually notify the personal broker-agent program about issuing a commitment to purchase for a product purchase. Another embodiment may combine one or more of the methods listed above.

In step 410, the personal broker-agent program may receive information about the terms of sale for the purchased product. The specific terms may include, in one embodiment, a product price, a delivery schedule, a warranty and a return policy. In one embodiment, the personal broker-agent program may receive and hold, i.e. intercept the ctp message generated by the computer system of the purchaser before it is sent to the Internet web site server. In one embodiment, the personal broker-agent program may review the type of product being purchased over the Internet i.e., a DVD player, a book, a piece of furniture, or an insurance policy. The personal broker-agent program may elect to participate in some of the product areas, based on the business interests of the provider of the personal broker-agent program. If the product being purchased fits with the business interests, then the personal broker-agent program may make an offer to the purchaser to accept or reject a contract for negotiating a better deal i.e., searching for improved terms within the specified time. If the product being purchased does not fit with the business interests, then the personal broker-agent program may release the intercepted message and allow the purchaser to proceed with the commitment to purchase transaction. In one embodiment, the personal broker-agent program may elect to process all commitments to purchase placed by the supplier to protect customer loyalty. In step 420, the purchaser is given an option to either accept or reject the contract presented by the personal broker-agent program to search for improved terms within the specified time. In one embodiment, the personal broker program may display a pop-up window on the purchaser's screen display. The display may have an icon such as an OK or Accept button. The purchaser may click on the OK or Accept button to indicate acceptance of the contract or click on No or Decline button to reject the contract. If the purchaser accepts the proposed contract then the program control passes on to step 430. In the event the purchaser rejects the proposed contract then the program control passes on to step 450. In step 450, the purchaser may proceed with completing the ctp transaction.

In one embodiment, steps 400, 410 and 420 may be combined wherein the purchaser initiates contact with the personal-broker agent program and makes a commitment to purchase a specified product. The purchaser may provide specific terms associated with the purchase of the product such as price, delivery, warranty, or other terms. The commitment to purchase may include a confirmed payment, and the purchaser may authorize the provider of the personal-broker agent program to make the specified purchase of the product within a pre-determined time interval.

In one embodiment, purchaser approval may be assumed or obtained ahead of time. The purchaser may load the personal broker-agent program in step 480 FIG. 4*d*. Prior to installing the personal broker-agent program, the personal broker-agent program service provider may require the purchaser to read and sign i.e., accept a license agreement and/or a master contract agreement for the use of that software in step 485. In step 490, the purchaser may elect to approve the master contract agreement or may elect to reject the agreement. If the purchaser rejects the master contract agreement then the personal broker-agent program is not installed on the purchaser's computer system. In step 495, the purchaser has accepted the terms of the master contract agreement and the personal broker-agent program is installed on the purchaser's computer system. Thus by executing steps 480, 485, 490 and 495 the purchaser may grant approval to contract ahead of time.

Steps 430, 440, 460 and 470 are executed in response to the purchaser accepting the contract for improved terms, presented by the personal broker-agent program, in one embodiment. In step 430, the personal broker-agent program receives a confirmation of acceptance of the contract for improved terms. In one embodiment, the purchaser may click on the OK or Accept button to indicate acceptance.

In step 440, the personal broker-agent program may conduct an auction to secure a better deal for the purchaser. In one embodiment, the auction may be conducted with a preferred set of suppliers for a specified product area. For example, one of the preferred suppliers may have established a pre-negotiated contract arrangement with the provider of the personal broker-agent program to beat any competitor's ctp price by at least two percent. The personal broker-agent program may receive responses to the auction request within the specified time. In another embodiment, the personal broker-agent program may conduct an Internet search for one or more suppliers who may be able to offer improved terms within the specified time. In another embodiment, the personal broker-agent program may conduct a search of a database, which may store the current prices, warranty terms and other terms of the most popular products purchased through the personal broker-agent program service provider. In response to the search, the personal broker-agent program may find one or more Internet sites offering improved terms.

In another embodiment, the system may be configured to conduct an auction to secure a better deal for the purchaser by directing the personal broker-agent to search for real time quotes for such terms as price, delivery time, warranty or return policy. For example, by securing real-time price quotes, the personal broker-agent may provide the system with more accurate prices, especially for goods that have hourly price fluctuations (e.g., commodities). In one embodiment, the personal broker-agent may be configured to secure real time quotes for delivery dates or timesin order to provide customers with a more accurate arrival time frame for the purchased goods. In another embodiment, the personal broker-agent may search for membership discounts to secure lower prices for the purchaser.

In another embodiment, the personal broker-agent may be configured to calculate real-time conversions of the currency of the purchaser's choice. For example, for an American purchaser buying from a Japanese vendor, the purchaser may opt (e.g., as a default setting) to have the currency converted from Japanese Yen to U.S. Dollars in real time at the time of the purchase. This conversion may be performed by querying a financial institution's server for a conversion rate (e.g., in parallel with performing the search based on price). The conversion rate may then be applied to the results of the search based on price before the results are presented to the customer. This embodiment may be particularly advantageous for currencies that have high fluctuations during any given day. The conversion rate may also be applied to other parts of the final cost, including for example, insurance and freight costs.

In another embodiment, the personal broker-agent may search for and calculate the complete delivery costs associated with the purchase. For example, the personal broker-agent may gather different quotes for different carriers, routes or delivery times. In one embodiment, the personal broker-agent may compare delivery costs based on the delivery method or route associated with each different company. For example, if the delivery is routed through different locations rather than directly, or if the delivery takes a week rather than two days, then the costs associated with it might be lower. Advantageously, the personal broker-agent may find the best possible delivery route or method associated with the lowest cost to the purchaser. In one embodiment, the calculation of the delivery costs may be one of the factors used by the personal broker-agent to compare terms to find the best deal for the purchaser, in step 460.

In one embodiment, the system may be configured to allow an intelligent switch to work in conjunction with the personal broker-agent to find the most efficient shipping route for the goods, thereby negotiating the best delivery price. An intelligent shipping agent may include one or more computers, coupled by a network and software providing functionality to arrange shipment for items being shipped or mailed. FIGS. 6 and 7 illustrate one example in which a typical shipping charge might be $80.00 for placing a container of goods on a direct flight from San Francisco 800 to New York 840 (or by using a single shipping company), while an indirect routing from San Francisco 800 through Dallas 880 and Atlanta 860 to New York 840 may yield a final cost of only $45.00 (i.e., $20.00 from San Francisco 800 to Dallas 880, $10.00 from Dallas 880 to Atlanta 860, and $15.00 from Atlanta 860 to New York 840). Depending on the schedules involved, the product or item may take longer to arrive at its final destination, but in many instances purchasers may be willing to accept longer shipping times in exchange for a lower shipping cost. In this example, each shipping company may have several set schedules in which goods are shipped on a periodic basis to and from each hub city. For example, the shipping company 800 in San Francisco may have one scheduled route daily to Chicago 820 and one scheduled route daily to Dallas 880. Similarly, shipping companies 820 and 880 may have scheduled routes on a periodic basis to Atlanta 860 and New York 840. In this embodiment, the intelligent switch in conjunction with the personal broker-agent could negotiate the best possible delivery route to yield the most efficient shipment of the goods to the purchaser.

In one embodiment, the personal broker-agent may search for a better deal based on the type of good, whether the good is a scarcity, a commodity, a good of unlimited supply, a perishable or a good that carries a product liability, such as a chemical. In another embodiment, the type of good may be compared to other terms, such as price and delivery, in order to find the best deal for the purchaser. For example, if the personal broker-agent found goods that were of unlimited supply and non-perishable, the personal broker-agent could find the best deal for the purchaser in offering to purchase a larger quantity at a lower price. Additionally, if the product carries a liability, the personal broker-agent could weigh the risks associated with this factor against the benefits of the product price or warranty in comparison, to determine the best possible deal for the purchaser (e.g., according to a predetermined formula). In another embodiment, the personal broker-agent may use the type of good as a factor in comparing the auction responses and selecting the best deal, in step 460.

Figure 5:
FIG. 5 illustrates one embodiment of a database record for comparing terms of purchase orders.

In step 460, the personal broker-agent program may compare the responses to the auction from the preferred suppliers and/or the Internet search and select the best deal, within the specified time. In one embodiment, the selection of the best deal may use selection criteria shown in FIG. 5 i.e., a comparison based on price, delivery, or other terms. In another embodiment, the personal broker-agent may compare prices and vendors depending on the vendor's status in the industry or the quality of the vendor. The commitment to purchase may be considered as the benchmark purchased order 500 for comparison. Responses from preferred suppliers 510 may be compared against the benchmark. The personal broker-agent program may submit the best deal to the purchaser, within the specified time, for executing the contract. In one embodiment, if the auction and/or the search does not materialize in a better deal and if the ctp price has increased in the meantime, then the personal broker-agent program may still honor the ctp price to maintain purchaser goodwill and loyalty.

In one embodiment, the personal broker-agent may consider and compare terms and conditions affecting the purchase, e.g., price or scarcity of product, and revert back to the terms of the original purchase if the original purchase terms are the best deal for the purchaser. Additionally, if the personal broker-agent cannot find a better deal or alternative, then it may just automatically execute the original purchase according to its terms. In another embodiment, after the personal broker-agent has compared all terms and conditions of different purchases and after it has offered the best deal to the purchaser, the purchaser may elect to forego the offer or "better deal" found by the personal broker-agent and instead accept the original purchase under its terms and conditions.

In step 470, the personal broker-agent program may execute the contract agreement with the purchaser. In one embodiment, executing the contract may include notifying or sending a confirmation to the purchaser via a variety of communication methods such as e-mail, phone, fax, or mail about the purchased product.

In another embodiment, the above method for negotiating improved terms for a product being purchased over the Internet may also be extended to products purchased from emerging computer system embodiments such as Internet appliances, cellular telephones with a browser 117*a*, web television or wireless PDA's with a browser 117*b* or 117*c*.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for negotiating improved terms for a product or service being purchased over the Internet, the method comprising:

receiving, by a computer system, information indicating one or more default purchasing standards for a purchaser using an Internet web site to purchase said product or service;

detecting, by said computer system, an issuance of a commitment to purchase with associated terms for said product or service being purchased by the purchaser using the Internet web site;

making, by said computer system, an offer to said purchaser for negotiating said improved terms within a specified time;

in response to said purchaser accepting said offer:
conducting, by said computer system, a search for said improved terms within said specified time;
receiving, by said computer system, information regarding a plurality of offers for said product or service within said specified time;
rejecting, by said computer system, one or more of the plurality of offers based on the default purchasing standards; and
presenting, by said computer system, one of the plurality of offers to the purchaser, wherein the presented offer includes said improved terms.

2. The method of claim 1, wherein said detecting comprises detecting said purchaser entering a credit card number, a pre-paid account number, a gift certificate number, an escrow account number, or a bank guaranty number.

3. The method of claim 1, wherein said detecting comprises detecting said purchaser viewing a particular web page.

4. The method of claim 1, wherein said detecting comprises detecting said purchaser accessing a particular URL.

5. The method of claim 1, wherein said detecting comprises detecting said purchaser clicking an icon to confirm order.

6. The method of claim 1, wherein said making an offer to said purchaser comprises displaying said offer on a screen of a computer used by said purchaser to purchase said product or service using an Internet web site.

7. The method of claim 1, further comprising executing said commitment to purchase.

8. The method of claim 1, wherein said commitment to purchase comprises a purchase order for which payment has been guaranteed by said purchaser.

9. The method of claim 1, wherein said improved terms of sale comprise one or more of the following: a better price, a better delivery, a better warranty, or a better return policy than said initial terms of sale.

10. The method of claim 1, wherein said making an offer to said purchaser comprises:
reading information associated with said commitment to purchase;
determining that said commitment to purchase represents an area of interest for an improved terms of sale service provider; and
in response to determining that said commitment to purchase represents an area of interest for said improved terms of sale service provider:
making said offer to said purchaser.

11. The method of claim 1, wherein said searching for sale offers for said product or service comprises conducting an auction amongst a plurality of suppliers for said product or service.

12. The method of claim 1, further comprising entering a legal contract with said purchaser to supply said product or service under said improved terms of sale.

13. The method of claim 1, wherein said searching for sale offers for said product or service comprises searching a database of preferred suppliers for said product or service.

14. A system for negotiating improved terms of sale for a product or service being purchased over a computer network, the system comprising:
a computer program;
a web site server computer;
wherein said computer program is executable on a client computer by a purchaser to connect with the web site server and wherein said computer program is further executable to detect an issuance of a commitment to purchase, by said purchaser, said product or service according to initial terms of sale; and
wherein the web site server is operable to:
receive information indicating one or more default standards for the purchaser, wherein said default standards specify product or service characteristics that are preferred by said purchaser;
subsequent to the receipt of information indicating one or more default standards for the purchaser, receive a notification indicating said issuance of said commitment to purchase;
make an offer to said purchaser to negotiate improved terms of sale for said product or service within a specified amount of time; and
in response to said purchaser accepting said offer:
searching for sale offers for said product or service;
comparing terms of sale for sale offers located from said searching to said initial terms of sale and said default standards; and
based on said comparing, presenting one of the sale offers located from said searching to the purchaser, wherein the presented sale offer includes said improved terms of sale and meets said default standards;
wherein said searching, comparing and presenting occur within said specified amount of time.

15. The system of claim 14, wherein said computer program is configured to detect the issuance of the commitment to purchase by detecting said purchaser entering a credit card number or a pre-paid account number or a gift certificate number.

16. The system of claim 14, wherein said computer program is configured to detect the issuance of the commitment to purchase by detecting said purchaser viewing a particular web page.

17. The system of claim 14, wherein said computer program is configured to detect the issuance of the commitment to purchase by detecting said purchaser accessing a particular URL.

18. The system of claim 14, wherein said computer program is configured to detect the issuance of the commitment to purchase by detecting said purchaser clicking an icon to confirm order.

19. The system of claim 14, wherein said web site server is configured to make the offer to said purchaser by displaying said offer on a screen of a computer used by said purchaser to purchase said product or service using an Internet web site.

20. The system of claim 14, wherein the computer program is configured to execute said commitment to purchase.

21. The system of claim 14, wherein said commitment to purchase comprises a purchase order for which payment has been guaranteed by said purchaser.

22. The system of claim 14, wherein said improved terms of sale comprise one or more of the following: a better price, a better delivery, a better warranty, or a better return policy than said initial terms of sale.

23. The system of claim 14, wherein said web server is configured to make the offer to said purchaser by:
reading information associated with the commitment to purchase;
determining that the commitment to purchase represents an area of business interest for an improved terms of sale service provider; and in response to determining that the commitment to purchase represents an area of business interest for said improved terms of sale service provider, making said offer to said purchaser.

24. The system of claim 14, wherein said searching for sale offers for said product or service comprises conducting an auction amongst a plurality of suppliers for said product or service.

25. The system of claim 14, wherein the web site server is operable to enter into a legal contract with said purchaser to supply said product or service under said improved terms of sale.

26. The system of claim 14, wherein said searching for sale offers for said product or service comprises searching a database of preferred suppliers for said product or service.

27. The system of claim 14, wherein said client computer is one or more of the following: a personal computer, a laptop computer, a notebook computer, an Internet-enabled cellular phone, an Internet-enabled personal digital assistant, or an Internet-enabled television.

28. A computer-readable storage medium, comprising program instructions, wherein the program instructions are executable by a computer system to implement the method of:
  receiving information indicating one or more default purchasing standards for a purchaser using an Internet web site to purchase said product or service;
  detecting an issuance of a commitment to purchase with associated terms for said product or service being purchased by the purchaser using the Internet web site;
  making an offer to said purchaser for negotiating said improved terms within a specified time;
  in response to said purchaser accepting said offer:
    conducting a search for said improved terms within said specified time; receiving information regarding a plurality of offers for said product or service within said specified time;
    rejecting one or more of the plurality of offers based on the default purchasing standards; and
    presenting one of the plurality of offers to the purchaser, wherein the presented offer includes said improved terms.

29. A method, comprising:
  detecting, by a computer system, an action by a purchaser that indicates that the purchaser is about to make an original purchase for a particular item or service over the Internet for a particular price;
  determining, by said computer system, that the purchaser agrees to wait a predetermined amount of time in exchange for a possibility of securing a better price for said particular item or service;
  searching, by said computer system, for said better price for said particular item or service;
  if said better price is found before said predetermined amount of time expires, purchasing, by said computer system, the particular item or service for the purchaser at the better price and charging the purchaser a new price between said particular price and said better price; and
  if said better price is not found before said predetermined amount of time expires, executing, by said computer system, the original purchase for the particular item or service over the Internet for the particular price.

30. The method as recited in claim 29, wherein if said original purchase is not available after said searching is complete, purchasing said particular item for said purchaser at another price and charging the purchaser said particular price.

31. The method of claim 29, wherein said detecting comprises detecting said purchaser entering a credit card number or a pre-paid account number or a gift certificate number.

32. The method of claim 29, wherein said detecting comprises detecting said purchaser viewing a particular web page.

33. The method of claim 29, wherein said detecting comprises detecting said purchaser accessing a particular URL.

34. The method of claim 29, wherein said detecting comprises detecting said purchaser clicking an icon to confirm order.

35. The method of claim 29, further comprising offering said purchaser an opportunity to enter into an alternative contract and displaying said alternative contract on a screen of a computer used by said purchaser to make said original purchase over the Internet.

36. The method of claim 29, wherein said original purchase comprises a purchase order for which payment has been guaranteed by said purchaser.

37. The method of claim 35, wherein offering said purchaser said opportunity to enter into said alternative contract comprises:
  reading information associated with said original purchase;
  determining if said original purchase represents an area of interest for an alternative contract provider;
  if said original purchase represents an area of interest for said alternative contract provider:
    making said alternative contract to said purchaser.

38. The method of claim 29, wherein searching for said better price comprises conducting an auction amongst a plurality of suppliers for said particular item.

39. The method of claim 29, wherein searching for said better price comprises searching a database of preferred suppliers for said particular item.

40. A computer-readable storage medium, comprising computer program instructions, wherein the program instructions are executable by a computer system to implement the method of:
  detecting an action by a purchaser that indicates that the purchaser is about to make an original purchase for a particular item or service over the Internet for a particular price;
  determining that the purchaser agrees to wait a predetermined amount of time in exchange for a possibility of securing a better price for said particular item or service;
  searching for said better price for said particular item or service;
  if said better price is found before said predetermined amount of time expires, purchasing the particular item or service for the purchaser at the better price and charging the purchaser a new price between said particular price and said better price; and
  if said better price is not found before said predetermined amount of time expires, executing the original purchase for the particular item or service over the Internet for the particular price.

41. A method, comprising:
  detecting, by a computer system, an action by a purchaser that indicates that the purchaser is about to make an original purchase for a particular item or service over the Internet for a particular price;
  intercepting, by said computer system, a message over the internet to delay said purchase for a predetermined amount of time, wherein the message includes commitment to purchase information for the purchaser regarding the item or service;

searching, by said computer system, for a better price for said particular item or service;

if said better price is found before said predetermined amount of time expires, purchasing, by said computer system, the particular item or service for the purchaser at the better price and charging the purchaser a new price between said particular price and said better price; and if said better price is not found before said predetermined amount of time expires, executing, by said computer system, the original purchase for the particular item or service over the Internet for the particular price.

42. A computer-readable storage medium, comprising computer program instructions, wherein the program instructions are executable by a computer system to implement the method of:

detecting an action by a purchaser that indicates that the purchaser is about to make an original purchase for a particular item or service over the Internet for a particular price;

intercepting a message over the internet to delay said purchase for a predetermined amount of time, wherein the message includes commitment to purchase information for the purchaser regarding the item or service;

searching for a better price for said particular item or service;

if said better price is found before said predetermined amount of time expires, purchasing the particular item or service for the purchaser at the better price and charging the purchaser a new price between said particular price and said better price; and if said better price is not found before said predetermined amount of time expires, executing the original purchase for the particular item or service over the Internet for the particular price.

43. The method of claim 1, wherein said making an offer comprises contacting said purchaser with a confirmation of said product or service purchase.

44. A method, comprising:

detecting, by a computer system, an action by a purchaser that indicates that the purchaser is making an original purchase for a particular item or service over the Internet for a particular price;

accessing, by said computer system, a broker-agent web site for seeking a better price for said particular item or service within a predetermined amount of time, where said seeking a better price comprises a plurality broker-agent programs performing multiple searches in parallel for said better price;

if said better price is found before said predetermined amount of time expires, purchasing, by said computer system, the particular item or service for the purchaser at the better price and charging the purchaser a new price between said particular price and said better price; and if said better price is not found before said predetermined amount of time expires, executing, by said computer system, the original purchase for the particular item over the Internet for the particular price.

* * * * *